United States Patent [19]  [11] 4,107,156
Sunamori et al.  [45] Aug. 15, 1978

[54] PROCESS FOR PREPARING GEL POLYMER OF VINYL COMPOUND AND GEL POLYMER THEREOF

[75] Inventors: Takashi Sunamori; Noboru Nishii, both of Otake, Japan

[73] Assignee: Mitsubishi Rayon Co., Ltd., Tokyo, Japan

[21] Appl. No.: 591,860

[22] Filed: Jun. 30, 1975

[30] Foreign Application Priority Data

Jul. 5, 1974 [JP] Japan ................................ 49/76271
Jul. 11, 1974 [JP] Japan ................................ 49/78717

[51] Int. Cl.$^2$ .......................... C08F 4/28; C08F 2/16; C08F 20/18; C08F 20/56
[52] U.S. Cl. ................................ 526/91; 260/29.6; 260/42.53; 427/340; 428/542; 526/93; 526/94; 526/234; 526/240; 526/258; 526/312; 526/303; 526/304; 526/306; 526/317; 526/319; 526/320; 526/328; 526/915; 526/916
[58] Field of Search .................... 526/91, 93, 94, 211, 526/212, 303; 260/79.3 MU

[56] References Cited

U.S. PATENT DOCUMENTS

| | | | |
|---|---|---|---|
| 2,697,700 | 12/1954 | Uraneck | 526/91 |
| 3,168,500 | 2/1965 | Suen | 526/30 X |
| 3,332,922 | 7/1967 | Hoover | 526/79.3 R |
| 3,506,630 | 4/1970 | Beier | 526/91 X |
| 3,642,735 | 2/1972 | Woodard | 526/91 |
| 3,864,297 | 2/1975 | Hornbaker | 526/91 X |

FOREIGN PATENT DOCUMENTS

| | | | |
|---|---|---|---|
| 1,134,513 | 8/1962 | Fed. Rep. of Germany | 526/91 |
| 6,213,889 | 9/1962 | Japan | 526/91 |
| 792,812 | 4/1958 | United Kingdom | 526/91 |
| 917,333 | 2/1963 | United Kingdom | 526/91 |

*Primary Examiner*—Christopher A. Henderson, Jr.
*Attorney, Agent, or Firm*—Oblon, Fisher, Spivak, McClelland & Maier

[57] ABSTRACT

A gel polymer of vinyl compounds suitable for use as a coating is prepared by mixing the following four components [A], [B], [C] and [D], Component [A], an aqueous composition comprising an aqueous solvent and at least one selected from the group consisting of water-soluble or water-dispersible vinyl compounds, Component [B], at least one compound having at least one functional group selected from the groups consisting of hydroxyl group, amino group, quaternary ammonium group, aldehyde group, mercapto group and a group capable of producing a hydroxyl group aldehyde group, mercapto group or amino group in an aqueous medium, Component [C], at least one compound capable of producing ferric ion or ceric ion in an aqueous medium and, Component [D], at least one sulfur compound capable of producing $S_xO_y^{2-}$-ion (wherein $x$ represents an integer of 1 to 6 and $y$ represents an integer of 1 to 7) in an aqueous medium, the polymerization being carried out by mixing a component [I] containing said component [C] and no component [D] with a component [II] containing said component [D] and no component [C].

11 Claims, No Drawings

PROCESS FOR PREPARING GEL POLYMER OF VINYL COMPOUND AND GEL POLYMER THEREOF

BACKGROUND OF THE INVENTION

The present invention relates to a novel process for preparing a gel polymer of vinyl compounds suitable for use as a coating, and, more particularly, relates to a process for the preparation of crosslinked polymers of water-soluble or water-dispersible vinyl compounds in the presence of specified catalysts. The present invention also relates to the gel polymer and the coating thereof.

The preparation of crosslinked polymers of vinyl monomers is well-known in the art. Known processes include:

(i) the polymerization processes using a redox catalyst;

(ii) the polymerization processes using a radical catalyst, and;

(iii) the polymerization processes using an activation energy such as ultraviolet ray, electron beam, $\gamma$ ray and the like.

Of the above polymerization processes for polymerizing vinyl monomers, the processes (i) have been widely utilized as a process for graft-polymerizing vinyl monomers onto cellulose due to the fact that the polymerization can be performed at a relatively low temperature and even in the presence of air. However, in these processes, the rate of the polymerization reaction is generally extremely low. Contrary to the processes (i), although the processes (ii) and (iii) have been well-known as processes for polymerizing vinyl monomers at a high polymerization rate, in these processes, the presence of oxygen in the polymerization system inhibits the radical polymerization of vinyl monomers because the oxygen acts as a polymerization inhibitor, and the production of the desired polymer is difficult. Especially, when vinyl monomers are directly applied to the surface of a substrate to be coated, polymerized and hardened in an atmosphere containing oxygen, such as in the air by using said processes (ii) or (iii) to thereby form a coating on the substrate, special conditions are necessary in order to prevent a phenomenon of stickiness of the surface of a coating due to the polymerization inhibition effect of oxygen.

The object of the present invention is to provide a process for polymerizing vinyl monomers even in the presence of oxygen at a high polymerization rate and without having a polymerization inhibition effect due to oxygen.

Another object of the present invention is to provide a gel polymer of vinyl compounds suitable for a coating on a substrate.

Other objects and advantages of the present invention will be apparent from the following description.

SUMMARY OF THE INVENTION

In accrodance with the present invention, there is provided a process for the preparation of a gel polymer of vinyl monomers comprising mixing the following four components [A], [B], [C] and [D], Component [A], an aqueous composition comprising an aqueous solvent and at least one selected from the group consisting of water-soluble or water-dispersible vinyl compounds, Component [B], at least one compound having at least one functional group selected from the groups consisting of hydroxyl group, amino group, quaternary ammonium group, aldehyde group, ercapto group and a group capable of producing a hydroxyl group, aldehyde group, mercapto group, or amino group in an aqueous medium, Component [C], at least one compound capable of producing ferric ion or ceric ion in an aqueous medium and, Component [D], at least one sulfur compound capable of producing $S_xO_y^{2-}$ ion (wherein $x$ represents an integer of 1 to 6 and $y$ represents an integer of 1 to 7) in an aqueous medium, the polymerization being carried out by mixing a component [I] containing said component [C] and no component [D] with a component [II] containing said component [D] and no component [C]. The components [A] and [B] can be incorporated into either component [I] or [II] or both components [I] and [III].

DESCRIPTION OF THE PREFERRED EMBODIMENTS

The water-soluble or water-dispersible vinyl compounds used in the present invention as a constituent of the component [A] include alkyl acrylates having 1 to 4 carbon atoms in the alkyl group such as, for example, methyl acrylate, ethyl acrylate, n-propyl acrylate, iso-propyl acrylate, n-butyl acrylate, sec-butyl acrylate, t-butyl acrylate; alkyl methacrylates having 1 to 4 carbon atoms in the alkyl group such as, for example, methyl methacrylate, ethyl methacrylate, n-propyl methacrylate, isopropyl methacrylate n-butyl methacrylate, sec-butyl methacrylate, t-butyl methacrylate; acryl amide, methacryl amide; acrylic acid, methacrylic acid, itaconic acid, crotonic acid, α-methyleneglutaric acid, p-vinylbenzene sulfonic acid, 2-sulfoethyl acrylate, 2-sulfoethyl methacrylate, 2-acrylamide-2-methyl-propane sulfonic acid and sodium, potassium and ammonium salts of said acids; diallyl-dimethyl ammonium bromide; methaylene bisacrylamide, methylene bismethacrylamide; compounds having the general formula, $$CH_2=\overset{R_1}{\underset{}{C}}-COO+CH_2-\overset{H}{\underset{R_2}{C}}-O)_{\overline{m}}OC\overset{R_1}{\underset{}{C}}=CH_2 \text{ or}$$

$$CH_2=\overset{R_1}{\underset{}{C}}-COO+CH_2-\overset{H}{\underset{R_2}{C}}-O)_{\overline{m}}OC-R_3CO+O-\overset{H}{\underset{R_2}{C}}-CH_2)_{\overline{l}}-OOC\overset{R_1}{\underset{}{C}}=CH_2$$

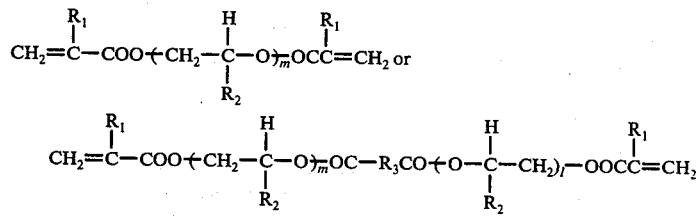

(wherein $R_1$ and $R_2$ represent H or $CH_3$, $R_3$ represents alkylene group —CH=CH—,

or

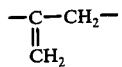

and m and l represent an integer of 1 to 10); glycerin triacrylate, glycerin trimethacrylate, trimethylolpropane triacrylate, trimethylolpropane trimethacrylate, pentaerythritol pentaacrylate, pentaerythritol pentamethacrylate; acryloyl or methacryloyl compounds of N-methylol- or N-alkyl-benzoguanamine, acryloyl or methacryloyl compounds of N-methylol- or N-alkylolmelamine.

Further, in addition to said water-soluble or water-dispersible compounds, vinyl compounds which are slightly insoluble in water, such as, for example, alkyl acylate or alkyl methacrylate having 5 to 18 carbon atoms in the alkyl group, styrene, divinyl benzene, unsaturated polyester and the like, can be used as a constituent of the component [A], unless they decrease the solubility or dispersibility of said water-soluble or water-dispersible compounds.

By the term "aqueous solvent" used in this specification is meant water, a mixture of water and water-soluble solvent(s) and a mixture of water and water-soluble or water-dispersible resin(s). The water-soluble or water-dispersible resin to be incorpolated into the aqueous solvent in the present invention includes vinyl resin such as, for example, acryl resin, vinyl acetate resin, vinyl acetate-ethylene copolymer; aminoalkyd resin; oil free alkyd resin; maleic polybutadiene resin, especially those resins having an acid value of 5 to 300, preferably of 30 to 200. Those resins are dissolved or dispersed in the aqueous solvent in the form of a salt thereof or by using any conventional emulsifiers. These resins are bound into the network structure of the gel polymer consisting mainly of the component [A], and contribute to the improvement of flexibility and impact resistance of the gel polymer due to the formation of the continuous structure in the gel polymer. Therefore, the gel polymer including those resins can be preferably utilized as a coating because of its very high strength.

The compounds having at least one hydroxyl group, used in the present invention as a constituent of the component [B] include, for example, water-soluble alcohols such as, for example, methanol, ethanol, isopropanol, butanol, isobutanol, t-butanol, cyclohexanol and cyclopentanol; ethylene glycol, propylene glycol, diethylene glycol, triethylene glycol, tetraethylene glycol, hexaethylene glycol, glycerin, starch, polyvinyl alcohol, sucrose, wood chip, cotton, trimethylol propane, pentaerythritol, acetylacetone, dibenzoyl methane, benzoylacetone, 8-hydroxyquinoline, 1,3-butylene glycol, 1,4-butylene glycol, methylol melamine, methylol benzoguanamine, hydroxyethyl acrylate, hydroxyethyl methacrylate, hydroxypropyl acrylate, hydroxypropyl methacrylate, hydroxybutyl methacrylate, glycerin monoacrylate, glycerin monomethacrylate, glycerin diacrylate, glycerin dimethacrylate, trimethylolpropane diacrylate, trimethylolpropane monomethacrylate, trimethylolpropane diacrylate, trimethylolpropane dimethacrylate, pentaerythritol monoacrylate, pentaerythritol monomethacrylate, pentaerythritol diacrylate, pentaerythritol dimethacrylate, pentaerythritol triacrylate, pentaerythritol trimethacrylate, mono- or di-acrylate of sucrose, mono- or di-methacrylate of sucrose, compounds having the general formula,

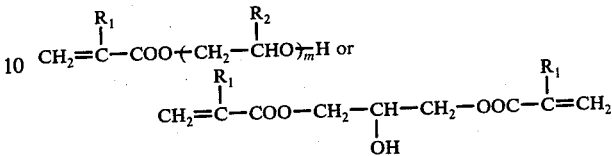

(wherein $R_1$, $R_2$ and $m$ represent the same as defined above), allyl alcohol, vinyl ethyl carbinol, diethyleneglycol monovinyl ether, crotonyl alcohol, N-methylol acrylamide, N-methylol methacrylamide, N-(1-deoxy-D-glucosyl)-acrylamide or -methacrylamide.

The compounds having at least one group capable of producing a hydroxyl group in the aqueous medium used in the component [B] of the present invention, include, for example, ethylene oxide, propylene oxide, diglycidyl ether of bisphenol A, diglycidyl esters of dicarboxylic acids, allylglycidyl ether, methaallylglycidyl ether, glycidyl acrylate, glycidyl methacrylate, vinyl oxazoline.

The compounds having at least one amino group or quaternary ammonium group, used in the component [B] of the present invention, include, for example, ammonia, hydroxyl amine, methylamine, ethylamine, isopropyl amine, isobutyl amine, t-butyl amine, cyclopropyl amine, cyclohexyl amine, cyclopentyl amine, n-lauryl amine, amino acetone, stearyl amine, benzyl amine, acetamide, benzyl hydroxyl amine, glycine, alanine, glutamic acid, lysine, tyrosine, ethylene diamine, propylene diamine, hexamethylene diamine, phenylene diamine, urea, ammonium carbamate, hydrazine, diethylamine, dimethyl amine, triethyl triamine, ethylene urea, dimethylaminoethyl acrylate, dimethylaminoethyl methacrylate, diethylaminoethyl acrylate, diethylaminoethyl methacrylate, t-butylaminoethyl acrylate, t-butylaminoethyl methacrylate β-aminoethyl vinyl ester, vinyl glutamate, glycine allylester, diallyl melamine, allyl urea, pyridine, allyl thiourea, 2-(N,N'-dimethylamino)-4-vinyl pyridine, p-dimethylamino styrene, 3-(styrene)-β-alanine, 2-(styrene)-glucine, allylbutyl-β-vinyloxy ethyl amine, vinyl amide, vinyl-diethyl amine, vinyl-dimethyl amine, dibutyl-β-vinyloxy ethyl amine, N,N'-diethylaminomethyl maleimide, diallyldimethylammonium bromide, and salts and quaternary ammonium salts thereof.

The compounds having at least one group capable of producing an amino group in the aqueous medium, used in the component [B] of the present invention, include, for example, methyl isocyanate, ethyl isocyanate, hexamethylene diisocyanate, tolylenediisocyanate, N-vinylisocyanate, 2-(1-aziridinyl) ethyl acrylate, 2-(1-aziridinyl) ethyl methacrylate.

The compounds having at least one mercapto group, used in the component [B] of the present invention, include, for example, methyl mercaptan, ethyl mercaptan, n-lauryl mercaptan, isobutyl mercaptan, sec-butyl mercaptan, t-butyl mercaptan, cyclohexyl mercaptan, stearyl mercaptan, thiophenol, thioglycollic acid, mercapto pyrimidine, benzyl mercaptan, allyl mercaptan, N-mercaptoethyl acrylamide, N-mercaptoethyl methacrylamide, 2-mercaptoethyl acrylate and 2-mercaptoethyl methacrylate.

The compounds having at least one aldehyde group, used in the component [B] of the present invention, include, for example, n-butyl aldehyde, isobutyl aldehyde, n-valero aldehyde, iso-valero aldehyde, croton aldehyde, benzaldehyde, furfural, acrolein, methacrolein, glyoxal, n-caproaldehyde.

The compound [B] mentioned above is mixed with the component [C] exemplified below to thereby form an intermolecular compound and then a polymerization initiator for the water-soluble or water-dispersible vinyl compound, is formed by the reaction of the intermolecular compound with the sulfur compound contained in the component [D] exemplified below. The polymerization initiator thus obtained has the advantage that it is not subject to the polymerization inhibition effect due to oxygen in the vinyl polymerization even in the presence of air and it gives a remarkably high polymerization rate compared to any conventional redox catalysts for a vinyl polymerization. Further, the component [B] is bound to the gel polymer, which consists mainly of the vinyl compound contained in the component [A], through the functional groups contained in the component [B] during the polymerization step and the component [B] also promotes the increase of molecular weight of the gel polymer. Therefore, the compound having two or more said functional groups or having at least one said functional group and at least one vinyl group, and capable of forming a stable intermolecular compound with the component [C] is preferably used as the component [B] in order to obtain a highly cross-linked gel polymer. This polymer can be preferably used as a coating film due to its characteristics.

The compound capable of producing a ferric ion or cerric ion in the aqueous medium, used in the component [C] of the present invention include, for example, iron metal; iron oxides, ferric salts such as nitrate, sulfate, hydrooxide and oxalate, ferric halogenides such as iodide, bromide and chloride, cerium metal; cerium oxides cerium (IV) salts such as nitrate, sulfate, hydrochloride cerium (IV) halogenide such as iodide, bromide and chloride. In the case where iron metal or cerium metal is used, an acid should exist in the aqueous medium.

The amount of the compound incorporated into the component [C] is not less than $5 \times 10^{-6}$ parts by weight, preferably in the range from $1 \times 10^{-5}$ to 1 parts by weight based on 100 parts by weight of the vinyl compound(s) in the component [A] in order to obtain a good gel polymer. Further, the amounts of the compound incorporated into the component [B] and the compound incorporated into the component [D] are generally equalmolar to that of the compound incorporated into the component [C] for a practical use, but the amounts can be widely varied depending upon the results desired.

The compounds capable of producing the ion having the general formula $S_xO_y^{2-}$ (wherein $x$ and $y$ represent the same as defined hereinbefore), used in the component [D] of the present invention, may be gaseous compounds, liquid compounds and solid compounds, and include, for example, SO, $SO_2$, $S_3O_2$; sulfoxyl acid, sulfurous acid, dithionous acid, pyrosulfuric acid, pyrosulfurous acid, dithionic acid, trithionic acid, tetrathionic acid, pentathionic acid, hexathionic acid, and sodium, potassium, and ammonium salts of these acids; sulfuryl chloride; dichloro polysulfanes ($S_nCl_2$) such as dichloro mono-sulfane, dichloro disulfane, dichloro trisulfane, dichloro tetrasulfane, dichloro pentasulfane, dichloro hexasulfane dichloro octasulfane; sulfinic acids such as, benzene sulfinic acid, dodecane sulfinic acid; sulfoxides. These sulfur compounds produce, in the aqueous medium, divalent ions such as, $SO_2^{2-}$, $SO_3^{2-}$, $S_2O_3^{2-}$, $S_2O_4^{2-}$, $S_2O_5^{2-}$, $S_2O_6^{2-}$, $S_2O_7^{2-}$, $S_3O_6^{2-}$, $S_4O_6^{2-}$, $S_5O_6^{2-}$ and $S_6O_6^{2-}$.

The theoretical mechanism of the formation of the gel polymer according to the present invention is not clear. However, it is believed that the gel polymer according to the present invention is produced by the following. That is, a ferric ion or ceric ion contained in the component [C] reacts with the compound having the specified functional group contained in the component [B] in the aqueous medium to thereby produce temporarily a intermolecular compound and, then, the intermolecular compound thus formed reacts with $S_xO_y^{2-}$-ion to thereby form a polymerization catalyst system capable of initiating the polymerization of the vinyl compound. When this catalyst system is applied to the vinyl compound, high polymerization of the vinyl compound in itself proceeds or propagates at a high rate, and the compound having the specified functional group used in the component [B] would be bound to the structure of the vinyl polymer having a high molecular weight. The polymerization rate of the vinyl compound in the aqueous medium by using this catalyst system is remarkably high compared to that by using a conventional redox catalyst comprising cerium ion and potassium persulfate. Further, this catalyst system can be applied to polymerizations of any water-soluble or water-dispersible vinyl compounds.

In the conventional polymerization process of a vinyl compound in an aqueous medium by using a redox catalyst combined cerium ion with a reducing agent, as the coagulation of the vinyl compound from the aqueous medium occurs due to the salting-out effect of the salt which is produced directly after the initiation of the polymerization of the vinyl compound, the preparation of the desired polymer is difficult. Contrary to this, the present catalyst system prepared as described above does not produce an undesirable salt that causes a salting-out of the vinyl compound, and can produce a vinyl polymer having a very high molecular weight even in the aqueous medium.

In the case where a vinyl compound having the aforementioned specified functional group is incorporated into the component [B], it is possible to obtain a gel polymer without using the component [A]. However, the gel polymer thus produced has poor strength. Accordingly, the component [A] should be used in the practice of the present invention.

The present polymerization process can be carried out at an ambient temperature even in the presence of oxygen without any polymerization inhibition action.

The gel polymer prepared according to the present invention is most useful for a coating film. The coating of the present gel polymer can be directly prepared on a substrate according to the following embodiments.

In accordance with one embodiment of the present method for forming a coating film on a substrate, the coating film is prepared by, firstly applying the components [A], [B] and [C], and then applying the component [D] onto the substrate. The components [A], [B] and [C] can be applied onto the substrate after mixing these component to thereby form a composition containing the above-mentioned intermolecular compound or by mixing these components directly on the substrate to thereby form the intermoleculr compound. The component [D] is then applied onto the coating layer thus formed, and the coating of the gel polymer is formed on the substrate.

In accordance with another embodiment of the present method for forming a coating on a substrate, the coating is prepared by, firstly applying the component [D], and, then, applying on the substrate, a component prepared by mixing the components [A], [B] and [C] and containing the abovementioned intermolecular compound which is produced by mixing the components [B] and [C].

In accordance with a further embodiment of the present method for forming a coating on a substrate, the coating is prepared by applying a mixing if the components [A] and [D] and applying a mixture of the components [B] and [C] on the substrate in any sequence, to thereby initiate the polymerization reaction of the vinyl compound and form a coating film of a gel polymer consisting of the components [A], [B], [C] and [D] on the substrate.

In accordance with a still further embodiment of the present method for forming a coating on a substrate, the coating is prepared by applying a mixture of the components [A] and [C] and applying a mixture of the components [B] and [D] on the substrate in any sequence, to thereby initiate the polymerization reaction of the vinyl compound and form a coating film of a gel polymer consisting of the components [A], [B], [C] and [D] on the substrate.

As is apparent from the above four embodiments of the present method for forming the coating film on the substrate, the mixing of the components [C] and [D] prior to the formation step of the coating should not be carried out. Such mixing undesirably decreases the polymerization rate of the vinyl compounds. This is because the catalyst system of the present invention are advantageously prepared by reacting the component [B] with the component [C] to thereby form the innermolecular compound, followed by allowing the compound to react with the component [D] (i.e. $S_xO_y^{2-}$ ion).

The substrate material onto which the present coating can be applied includes, for example, metal, wood, fiber, asbestos, concrete and slate.

As the starting materials for forming a coating film, used in the present invention, are mainly an aqueous liquid containing water-soluble or water-dispersible materials of low molecular weight, they can permeate into the microstructure of the substrate and a coating film is formed therein. Thus, when the present coating method is applied to the rusty surface of a metallic substrate, a coating film having a cross-linked network structure can be formed even in the microporous inner structure of the rust. Accordingly, the present coating method can be advantageously applied to the coating for maintenance of a rusty bridge. According to the present method the removal of the rust, which is inevitable prior to a coating in the conventional maintenance method, is not required.

The invention will be further illustrated by, but is by not means limited to, the following Examples, in which all parts and percentages are by weight unless otherwise specified.

EXAMPLE 1

Aqueous compositions were prepared by mixing 7.03 g of acrylamide, 80 ml of deionized water and approximately 200 mg of each compound listed in the following Table 1.

Table 1

| | | |
|---|---|---|
| 1. Compound containing hydroxyl group | Methanol, ethanol, iso-prppyl alcohol, cyclohexanol, cyclopentanol, n-lauryl alcohol, benzyl alcohol, glycolic acid, ethylene glycol, propylene glycol, diethylene glycol, glycerin, trimetylol propane, pentaerythritol, dipentaerythritol, mannitol, cyclohexanediol, glycerine monomethylester, ethylene glycol monomethylether, ethylene oxide, methylolmelamine, polyvinyl alcohol, starch, acetylacetone, dibenzoyl methane, benzoyl acetone, 8-hydroxyquinoline, filter paper, wood chip and cotton | |
| 2. Compounds containing amino group or quaternary ammonium group | Ammonia, ammonium chloride, ammonium sulfate; methylamine, ethylamine, n-laurylamine, iso-propylamine, iso-butylamine, tert-butylamine, aminoacetone, cyclopropylamine, cyclohexylamine, allylamine, aminoethyl methacrylate, benzylamine, aniline, hydroxylamine, benzylhydroxylamine and hydrochlorides of the above amines; glycine, alanine, glutamic acid, lysine, tyrosine, histidine, cystine and hydrochlorides of the above amino acids; ethylene diamine, hexamethylenediamine, urea, thiourea, ammonium carbamate, hydrazine, melamine and hydrochlorides thereof; diethylamine, triethylamine, ethylene urea and hydrochlorides thereof. | |
| 3. Compounds containing mercapto group | Methyl mercaptan, hydrogen disulfide, ethyl mercaptane, n-lauryl mereaptane, iso-butyl mercaptane, cyclohexyl mercaptane, thioglycollic acid, benzyl mercaptane and ethane dithiol. | |
| 4. Compounds containing aldehyde group | Formaldehyde, paraformaldehyde, acetoaldehyde, n-butylaldehyde, glyoxal and benzaldehyde. | |

Ammonium cerium (IV) nitrate was dissolved in 1 N nitric acid solution in such an amount that the concentration of ceric ion was 0.1 mol/1 and, thus, an aqueous solution containing ceric ion was prepared. When 2 ml of the aqueous cerium (IV) solution was added to 98 ml of each of the aqueous compositions prepared above, all the mixed aqueous solutions became turbid white or light-brown. These results show that an intermolecular compound or a complex between ceric ion and the compound listed in Table 1 was formed in each case.

When sulfite ion ($SO_3^{2-}$) was supplied to each of the mixed aqueous solutions by bubbling sulfur dioxide thereinto, the turbidity or light-brown of the aqueous solutions disappeared and the viscosity of the aqueous solutions increased in each case.

When 2 ml of a 2% aqueous sodium sulfite solution was added to 98 ml of each turbi or light-brown mixed aqueous solution, the turbidity or light-brown color of the solutions disappeared, both the temperature and the viscosity of the solution increased, and, further, the polymerization of acrylamide was initiated. The surface of a rusty mild steel plate was coated with a mixture of 98 ml of each of the above mixed aqueous solution and 2 ml of a 2% aqueous sodium sulfite solution directly after mixing, and allowed to stand in an ambient air for air-drying. It was observed that the coating thus obtained had a structure in which the rust on the mild steel plate was captured by a thin layer of acrylamide polymer and, also that acrylamide polymer fully permeated into the inner structure of the rust.

As a comparative example, after an aqueous acrylamide solution, containing no compound listed in Table 1, was mixed with an aqueous solution containing ceric ion, sulfur dioxide was bubbled thereinto in one case, and in another 2% of an aqueous sodium sulfite solution was added thereto. However, increases of the temperature and viscosity of the aqueous acrylamide solution were not observed in either case, and the acrylamide was not polymerized at all or the polymerization rate thereof was extremely low.

EXAMPLE 2

Aqueous compositions were prepared by the same procedure as in Example 1, except that the compounds listed in the following Table 2 were used instead of the compounds listed in Table 1.

Table 2

| Hydroxyethyl methacrylate, hydroxylethyl acrylate, 2-hydroxypropyl methacrylate, 2-hydroxypropyl acrylate, p-vinylphenyl glucoside, diethyleneglycol monovinylether, N-(1-deoxy-D-glucosyl)-acrylamide, N-(1-deoxy-D-glucosyl)-methacrylamide, N-methylol acrylamide, N-methylol methacrylamide, glycine allyl ester, N-vinylurethane, allylurea, dimethylaminoethyl methacrylate, diallyldimethyl-ammonium bromide, 2(1-aziridinyl) ethyl methacrylate, allyl mercaptane and crotonaldehyde. |
|---|

98 ml of each of the aqueous compositions thus prepared was mixed with 2 ml of the aqueous ceric ion solution used in Example 1. All of the resultant mixed aqueous solutions became turbid white or light blown. This showes that intermolecular compounds or complexes were formed between the secondary cerium ion and the compounds listed in Table 2.

When 2 ml of a 2% aqueous sodium sulfite solution was added to each turbid aqueous solution, the turbidity of the solution disappeared, and the temperature and viscosity of the solution increased in each case. This shows that the polymerization reaction of acrylamide occurred with each compound listed in Table 2. When each solution was allowed to stand, it gradually changed to gel and, after the solution was allowed to stand for one night, hard gel was formed. When each resultant hard gel was crushed and, then, extracted with lukewarm water, the compounds listed in Table 2 were not substantially extracted. Since this gel had an excellent water resistance, alkali resistance and solvent resitance, it was obvious that this gel had a three-dimensional cross-linked structure. Further, the characteristic absorption spectrum, due to polymerizable unsaturated bond, was not detected by infrared spectroscopy. From this result, it was confirmed that both acrylamide and the compounds listed in Table 2 were the constituent of the gel polymer.

When the surfaces of several rusty steel plates were coated with the mixed aqueous solutions prepared above, respectively, directly after their mixing and allowed to stand in the air, a hard coating film was formed on the rusty portions and the non-rusty portions of the plates. When the coating on the rusty portions was torn off, it was observed that the coating was also satisfactorily formed in the inner structure of the rust.

EXAMPLE 3

An aqueous composition was prepared by adding 10 ml of a 0.1 mol/1 aqueous methanol solution to a mixture of 7.03 g acrylamide and 80 ml of deionized water. Another aqueous composition was prepared by the same procedure as above, except that 10 ml of a 0.1 ml/1 hydroxyethyl acrylate in water solution was used instead of the aqueous methanol solution. To 98 ml of each of these two kinds of aqueous compositions, 2 ml of the aqueous ammonium cerium (IV) nitrate solution used in Example 1 was added and, then, 2 ml of a 2% aqueous solution of each compound listed in the following Table 3 was added, respectively. As a result of this addition, gelation of the entire solution occurred with respect to all compounds listed in Table 3.

Table 3

| Potassium sulfite, ammonium sulfite, ammonium bisulfite, sodium thiosulfate, sodium dithionite, sodium pyrosulfite, sodium pyrosulfate, sodium tetrathionate, dimethyl sulfoxide, sodium benzenesulfinate, sodium hydrosulfite, sodium metabisulfite |
|---|

EXAMPLE 4

When 2 ml of the aqueous ammonium cerium (IV) nitrate solution used in Example 1 was added to 98 ml of each of two kinds of the aqueous compositions prepared in Example 3 and, then, 0.2 ml of sulfuryl chloride was added thereto, gelation of the entire solution occurred.

EXAMPLE 5

Each of one hundred and eleven kinds of aqueous compositions was prepared by the steps of adding deionized water to a mixture of 7.03 g of acrylamide and 10 ml of 0.1 mol/1, N,N-methylenebisacrylamide in such an amount that the total volume of the solution was 98 ml and, then, adding 2 ml of the aqueous ammonium cerium (IV) nitrate solution used in Example 1 and 200 mg of each compound listed in Table 1, respectively. When one hundred and eleven rusty steel plates were coated with mixtures of these aqueous solutions and 2 ml of a 2% aqueous sodium sulfite solution, respectively, directly after mixing and allowed to stand for one night, completely gelled coating films were formed on the steel plates in all cases.

EXAMPLE 6

When a coating film was formed on a rusty steel plate in the same manner as in Example 5, except that 2.0 g of acrylic acid was added to 100 ml of the aqueous vinyl compound solution used in Example 5, gelation of the coating occurred at a considerably high rate.

EXAMPLE 7

Each of twelve kinds of aqueous compositions was prepared by dissolving 7.03 g of acrylamide and 1.0 g of ethylene glycol with deionized water in such an amount that the total volume of the solution was 96 ml. When 2 ml of the aqueous ammonium cerium (IV) nitrate solution used in Example 1 and 2 ml of each compound listed in Table 3 in water solution was added to the resultant aqueous composition, respectively, gelation of the aqueous solution occurred in each case. From this result, it is obvious that ethylene glycol also serves as a crosslinking agent.

When rusty steel plates were coated with the twelve aqueous solutions, respectively, directly after their preparation and allowed to stand for one night, a crosslinked and hardened coating film was formed in each case.

EXAMPLE 8

Each of one hundred and eleven kinds of aqueous compositions was prepared by the steps of diluting 7.03 g of acrylamide with 0.01 mol/1 N,N'-methylene bisacrylamide in water solution in each an amount that the total volume of the resultant aqueous composition was 98 ml and, then, adding approximately 200 mg of each compound listed in Table 1, respectively. When 2 ml of the aqueous solution containing the ceric ion used in Example 1 was added to each of these aqueous compositions, the aqueous compositions became turbid white or light-brown. This shows that complex compounds between ceric ion and the compounds listed in Table 1 were formed.

Polished mild steel plates after degreasing and water-washing, were allowed to stand in air for 30 days to thereby generate red rust on the entire surface of the steel plates. When the surfaces of the rusty plates were coated with the aqueous compositions prepared above, respectively, by using a so-called curtain-coating or flow-coating method, followed by spraying a small amount of a 2% aqueous sodium sulfite solution, gelation of the coating occurred immediately and a hardened coating film was formed in a few minutes. When the hardened coating film was torn off with a knife, it was observed that the vinyl monomer fully permeated into the inner structure of the rust and hardened therein.

As a comparative example, the surface of one of the rusty steel plates used above was coated with an aqueous composition which was prepared in the same manner as above, except that no compound listed in Table 1 was incorporated, and then a small amount of a 2% aqueous sodium sulfite solution was sprayed thereon. Contrary to the above example, gelation of the coating did not occur immediately, and the coating remained in a non-hardened state or became gel at a very low rate.

EXAMPLE 9

An aqueous composition was prepared by the steps of dissolving 7.03 g of acrylamide and 200 mg of methanol with 0.01 mol/1 N,N'-methylene bisacrylamide in water solution in such an amount that the total volume of the aqueous composition was 98 ml and, then, adding 2 ml of the aqueous solution containing the ceric ion used in Example 1.

Rusty steel plates prepared as described in Example 8 were coated with the aqueous composition prepared above, by using a curtain-coating method, followed by spraying a small amount of a 2% aqueous solution of each sulfur compound listed in the following Table 4, respectively.

Table 4

Sulfur dioxide, potassium sulfite, ammonium sulfite, sodium bisulfite, potassium bisulfite, ammonium bisulfite, sodium thiosulfate, sodium hydrosulfate, sodium metabisulfite, sodium pyrosulfate, sodium tetrathionate, dimethyl sulfoxide and sodium dodecanesulfinate.

As a result of this treatment, gelation of the coating occurred immediately, and the coating hardened in a few minutes. It was observed that the coating fully permeated into the inner structure of the rust and had a property of extremely high adhesion to the substrate.

Further, when the rusty steel plate was coated in the same manner as above, except that sulfur dioxide gas was blown instead of the aqueous solutions of sulfur compounds listed in Table 4, the same hardened coating film was obtained.

EXAMPLE 10

To 98 ml of an aqueous composition containing 0.89 mol/1 acrylamide, 0.01 mol/1 N,N'-methylene bisacrylamide and 0.1 mol/1 of each comonomer listed in Table 5 below, 200 mg of methanol and 2 ml of the aqueous ceric ion solution used in Example 1 were added in series. Thus, twelve kinds of coating compositions were prepared.

Rusty mild steel plates prepared as described in Example 8, were coated with the coating composition thus obtained, by using a curtain-coating method, and then a small amount of a 2% aqueous sodium sulfite solution was sprayed onto the surfaces thereof. After the coating was allowed to stand in air for about two minutes, hardening of the coating and adhesion property to the substrate of the coating were determined with respect to the twelve kinds of coating compositions. The results are also shown in Table 5.

Two kinds of coating compositions were prepared in the same manner as above, except that tetraethyleneglycol dimethacrylate one time, and, next, phthalic acid (diethyleneglycol methacrylate) diester was used instead of the comonomer listed in Table 5.

Table 5

| Comonomer used | HEA | HEMA | EA | AEMA | IMA | IA | IA-Na$_2$ | HEA/EA = 1/1 | AA/AEMA = 1/1 | HEMA/AEMA = 1/1 | EA/AEMA = 1/1 | IA-Na$_2$/AEMA = 1/1 |
|---|---|---|---|---|---|---|---|---|---|---|---|---|
| Hardening property | ◎ | ◎ | ◎ | ◎ | ◎ | ◎ | ◎ | ◎ | ◎ | ◎ | ◎ | ◎ |
| Adhesion property | ◎ | ○ | ○ | ○ | ◎ | ○ | ○ | ○ | ◎ | ◎ | ○ | ○ |

(Note) The abbreviations and symbols used in above Table are as follows.
HEA: hydroxyetyl acrylate,
EA: ethyl acrylate
IMA: 2-(1-aziridinyl) ethyl methacrylate,
IA-Na$_2$: disodium itaconate,
◎: excellent
HEMA: hydroxyethyl methacrylate,
AEMA: dimethylaminoethyl methacrylate,
IA : itaconic acid,
AA : acrylic acid
○: good When the coating film was formed from each of these coating compositions, in the same manner as above, the coating completely hardened.

EXAMPLE 11

The surfaces of ten rusty steel plates prepared as described in Example 8, were coated with a 2% aqueous sodium sulfite solution by using a curtain-coating method. After drying, a thin layer of sodium sulfite was obtained on the surface of the steel plates. When the surfaces of the steel plates thus obtained were coated with ten kinds of the coating compositions prepared in Example 8, respectively, gelation of the coating occurred immediately in each case and the coating hardened in a few minutes. The hardened coating films fully permeated into the inner structure of the rust, and the property of adhesion to the substrate of the coating film was good.

EXAMPLE 12

100 parts of a copolymer solution prepared by polymerizing 37 parts of dodecyl methacrylate, 26 parts of styrene, 12 parts of 2-hydroxyethyl methacrylate, 15 parts of N-butoxymethyl acrylamide and 4 parts of itaconic acid in 79 parts of isopropanol, were neutralized by adding 3 parts of $\beta$-dimethylamino ethanol.

To 3000 parts of the neutralized copolymer solution prepared as described above, 750 parts of red oxide was added and, then, they were mixed for 24 hours in a ball mill, followed by dilution with water to five times the original volume. In the aqueous copolymer dispersion containing red oxide thus obtained, acrylamide and N,N'-methylene bisacrylamide were dissolved in such amounts that the concentration of the former was 0.99 mol/l and that of the latter 0.01 mol/l.

A coating composition was prepared by adding, to 98 ml of the mixture so obtained, 2 ml of the aqueous solution containing the ceric salt prepared in Example 1 and 1 ml of methanol. When a rusty steel plate prepared as described in Example 8 was coated with this coating composition by using a curtain-coating method, followed by blowing sulfur dioxide gas, gelation of the coating occurred immediately and the coating hardened in a few minutes. The coating film so obtained was allowed to stand in air at ambient temperature to thereby produce a coated plate having a red crosslinked coating film.

EXAMPLE 13

Eighteen kinds of coating compositions were prepared by adding, with agitation, 1.0 g of each soluble monomer listed in the following Table 6 to 96 ml of aqueous solution containing 0.99 mol/l acrylamide and 0.01 mol/l N,N'-methylene bisacrylamide and, then, adding deionized water until the total volume of the coating composition was 100 ml. A 0.1 mol/l aqueous ammonium cerium (IV) nitrate solution was seperately prepared by using 1N aqueous nitric acid solution.

Eighteen rusty steel plates prepared as described in Example 8 were coated with the aqueous ammonium cerium (IV) nitrate solution prepared above by using a curtain-coating method, and dried. Thus, steel plates having a thin layer of said cerium salt thereon were obtained.

When the surfaces of these eighteen rusty steel plates were coated with the eighteen kinds of coating compositions prepared above, respectively, and then sulfur dioxide gas was uniformly blown for a few minutes against the entire surfaces thereof, gelation of the coatings occurred immediately and the coatings hardened in a few minutes.

All coatings thus obtained and a good hardening property. It was observed that the coatings fully permeated into the inner structure of the rust when the coating films were torn off with a knife.

TABLE 6

Copolymerizable monomer containing at least one selected from the group consisting of hydroxyl group, amino group, quaternaryammonium group, aldehyde group and mercapto group;

hydroxyethyl methacrylate, hydroxyethyl acrylate, 2-hydroxypropyl methacrylate, 2-hydroxypropyl acrylate, N-(1-deoxy-D-glucosyl)-acrylamide, N-(1-deoxy-D-glucosyl)-methacrylamide, p-vinylphenyl glucoside, diethyleneglycol monovinylether, N-methylol acrylamide, N-hydroxyethyl acrylamide, glycine allyl ester, N-vinyl urethane, allyl urea, dimethylaminoethyl methacrylate;

diallyl-dimethyl-ammonium bromide, 2-(1-aziridinyl)ethyl methacrylate, allyl mercaptane, and croton aldehyde

EXAMPLE 14

Coatings on rusty steel plates were prepared in the same manner as in Example 13, except that a coating composition containing hydroxyethyl acrylate, as a polymerizable monomer, was used and 2 ml of about a 2% aqueous solution of each of the sulfur compound listed in Table 7 below was sprayed instead of sulfur dioxide. Gelation of the coating occurred immediately, and hardened completely in a few minutes.

The coating film thus obtained had a good hardening property. It was observed that the coating film fully permeated into the inner structure of the rust when the coating film was torn off with a knife.

Table 7

Potassium sulfite, ammonium sulfite, sodium bisulfite, potassium bisulfite, ammonium bisulfite, sodium thiosulfate, sodium hydrosulfite, sodium metabisulfite, sodium pyrosulfate, sodium tetrathionate, dimethyl sulfoxide and sodium dodecanesulfinate.

EXAMPLE 15

Five kinds of coating compositions were prepared by p preparing 98 ml of an aqueous composition comprising 0.89 mol/l acrylamide, 0.01 mol/l N,N'-methylene bisacrylamide and 0.1 mol/l of the comonomers listed in Table 8 below, respectively and, then, adding about 500 mg of dimethylaminoethyl metacrylate and 2 ml of deionized water in series to the aqueous composition.

Rusty steel plates, having a thin layer of ceric salt on the surface thereof prepared in the same manner as in Example 13, were coated with the above coating compositions respectively by using a curtain-coating method and, then, a small amount of a 2% aqueous sodium sulfite solution was sprayed on the surface of each plate.

The results with respect to the hardening property and the property of adhesion to the substrate of the coating films are shown in Table 8 below.

Table 8

| Comonomer used | HEMA | EA | AA | IA | IA-Na$_2$ |
|---|---|---|---|---|---|
| Hardening property | ◎ | ◎ | ◎ | ◎ | ◎ |
| Adhesion property | ○ | ○ | ◎ | ○ | ○ |

(Note) The abbreviations and symbols used in the table are the same as defined in table 5.

15

When coating films were formed in the same manner as above, except that an equimolar quantity of tetraethyleneglycol dimethacrylate one time and, next, phthalic acid di(diethyleneglycol methacrylate) ester, was used instead of the comonomers listed in Table 8. the coatings also completely hardened.

EXAMPLE 16

A coating composition was prepared by dissolving acrylamide and N,N'-methylene bisacrylamide in such amounts that the concentration of the former was 0.99 mol/l and that of the latter was 0.01 mol/l, in the aqueous resin composition containing the red oxide prepared in Example 12 and, then, adding 1 ml of hydroxyethyl acrylate to 99 ml of the above mixture.

A rusty steel plate, having a thin layer of ceric salt on the surface thereof prepared in the same manner as in Example 13, was coated with the above coating composition by using a curtain-coating method. When sulfur dioxide gas was blown against the surface of the plate, gelation of the coating occurred immediately and the coating hardened in a few minutes. When the hardened coating was allowed to stand in air at ambient temperature, a coated plate having a red cross-linked coating film thereon was obtained.

EXAMPLE 17

Example 16 was repeated except that 0.1 mol/l cerium (IV) nitrate in a 30% aqueous isopropylalcohol solution was used instead of the aqueous ceric salt solution. A similar result to that in Example 16 was obtained. Further, the vinyl polymer was uniformly and firmly dispersed in the gel polymer consisting mainly of acrylamide, and a coating film having a high strength was formed.

EXAMPLE 18

516 parts of deionized water and 16 parts of Levenol WZ (emulsifying agent, commercially available from Kao Atlas Co. Ltd. in Japan) were charged into a four necked flask fitted with a thermometer, a reflux condenser, an agitator and a dropping funnel, and the flask was maintained at a temperature of 60° C. Then, the following mixture was added dropwise into the flask over a period of 2 hours; and after the completion of the dropwise addition, the content of the flask was polymerized for 3 hours at the same temperature. The aqueous polymer dispersion so obtained was adjusted to a pH of 9 by adding a 2% sodium hydroxide solution in a limited amount.

|  | Parts |
| --- | --- |
| styrene | 192 |
| n-butyl acrylate | 200 |
| methacrylic acid | 8 |
| emulsifying agent | 16 |
| ammonium persulfate | 0.9 |
| sodium bisulfite | 0.6 |
| deionized water | 60 |

One hundred and eleven kinds of aqueous liquids were prepared by adding, under good agitation, 8.0 parts of acrylamide, 0.5 parts of N,N'-methylene bisacrylamide, 0.5 parts of each compound listed in Table 1, or Example 1, and 1.0 part of a 0.1 mol/l aqueous ammonium cerium (IV) nitrate solution. 150 parts of the aqueous polymer dispersion obtained above was separately added to each of the 111 kinds of aqueous liquids. When sulfur dioxide gas was blown through each of these aqueous compositions so obtained, gelation was initiated at once in each case, and the compositions hardened or solidified in a few minutes. The aqueous dispersed polymer was not aggregated and was uniformly bound in the gel polyerm.

EXAMPLE 19

300 parts of deionized water and 0.02 parts of an emulsifying agent (Emarl #0 produced by Kao Atlas Co. Ltd.) were charged into the flask used in Example 18 and the flask was maintained at a temperature of 70° C. The following mixture was then added dropwise over a period of 3 hours to thereby polymerize the content of the flask. After a completion of the dropwise addition, the content of the flask was maintained at the same temperature with stirring for 1.5 hours and the polymerization reaction was completed. The pH of the dispersion thus obtained was 2.4.

|  | Parts |
| --- | --- |
| styrene | 66 |
| n-butyl acrylate | 62 |
| sodium 2-sulfoethyl methacrylate | 2 |
| potassium persulfate | 0.2 |
| deionized water | 100 |

When 150 parts of the above aqueous polymer dispersion was added to 20 parts of each of the one hundred and eleven kinds of the aqueous compositions comprising mainly vinyl monomer, prepared in Example 18, and then 2 ml of a 2% aqueous solution of each of the sulfur compounds listed in Table 4 above was added, respectively, all aqueous compositions initiated to gel and, cross-linked polymers were formed.

When the surfaces of steel plates with red rust were coated with the above aqueous compositions respectively prior to the addition of the sulfur compound and a 2% aqueous potassium sulfite solution was sprayed with a spray, the coating initiated to gel at once and a hardened coating film with exclusion of water was formed on the coated surface. When this coating was folded to an angle of 180°, the coating completely adhered to the substrate.

EXAMPLE 20

One hundred and eleven kinds of aqueous coating compositions were prepared by adding 200 mg of each of the one hundred and eleven compounds shown in Table 1 to 98 ml of an aqueous monomer mixture of 0.99 mol/l acrylamide and 0.01 mol/l N,N'-methylene bisacrylamide and, subsequently, adding a 2% aqueous sodium sulfite solution until the total amount of each composition was 100 ml. Ammonium cerium (IV) nitrate was dissolved with a 0.1 N nitric acid solution to obtain a 0.1 mol/l ceric solution.

Coating substrates comprising commercially available polished mild steel plates which were degreased, water-washed and dried and coating substrates having red rust on the entire surface thereof, prepared as described in Example 8, were prepared. The surface of each of the one hundred and eleven cleaned, polished mild steel plates and one hundred and eleven rusty mild steel plates was coated with an aqueous ammonium cerium (IV) nitrate solution and dried. Then, the 111 aqueous coating compositions prepared above were coated on the 111 polished steel plates, repectively, and the 111 rusty steel plates, respectively. Polymerization of the coating was immediately initiated in each case and a completely hardened coating film was obtained in a few minutes.

After these coated plates were allowed to stand for one night, it was noted from a folding test that the coatings completely adhered to the substrates and, accordingly, the adhesion property of the coatings was good. Further, when the coatings on the rusty plates were torn off with a knife, it was noted from observation of their inner structure that the hardened coating films fully permeated into the inner structure of the rust.

EXAMPLE 21

Twelve kinds of aqueous coating compositions were prepared by adding 200 mg of methanol to 98 ml of an aqueous monomer mixture of 0.99 mol/1 acrylamide and 0.01 mol/1 N,N'-methylene bisacrylamide and, subsequently, adding a 2% aqueous solution of each sulfur compound shown in Table 4, respectively, until the total amount of the composition was 100 ml.

The surface of twelve cleaned, polished mild steel plates and twelve rusty mild steel plates, prepared as described in Example 20, were coated with an aqueous ammonium cerium (IV) nitrate solution and dried. Then the twelve aqueous coating compositions prepared above were coated on the twelve polished steel plates, respectively, and the twelve rusty steel plates respectively. Each coating started to gel immediately and completely hardened in a few minutes.

The property of adhesion to the substrate and the permeation property, of the coating film, determined in the same manner as in Example 20, were good.

EXAMPLE 22

Twelve kinds of aqueous coating compositions were prepared by adding 200 mg of methanol to 98 ml of an aqueous monomer mixture of 0.89 mol/1 acrylamide, 0.01 mol/1 N,N'-methylene bisacrylamide and 0.1 mol/1 of each comonomer shown in Table 9, respectively, and, then, adding a 2% aqueous sodium sulfite solution until the total amount of the composition was 100 ml.

The surfaces of twelve rusty steel plates prepared in the same manner as in Example 20, were coated with an aqueous ammonium cerium (IV) nitrate solution and dried and, then coated with the aqueous coating compositions, prepared above, respectively.

The hardening property and adhesion property, to the substrate, of the coating film are shown in Table 9.

EXAMPLE 23

The surfaces of 111 rusty plates, prepared in the same manner as in Example 20, were coated with the 111 kinds of the aqueous coating compositions prepared as described in Example 20, respectively, by using a curtain-coating method and, then, a 2% aqueous ammonium cerium (IV) nitrate solution was sprayed on the surfaces. The coatings started to gel immediately, and hardened completely in a few minutes. Further, the coating films were formed in the inner structure of the rust.

The same result was obtained when the above test was repeated except that a 30% isopropylalcohol in water solution was used as a solvent of the 2% aqueous ammonium cerium (IV) solution.

EXAMPLE 24

A coating composition was prepared by adding acrylamide and N,N'-methylene bisacrylamide to the aqueous resin dispersion containing red oxide prepared in Example 12 in such amounts that the concentration of the former was 0.99 mol/1 and that of the latter was 0.01 mol/1 and, then, adding 2 ml of a 2% aqueous sodium sulfite solution to 98 ml of the above mixture.

When a surface of rusty mild steel plate treated with ceric salt in a water solution as in Example 20, was coated with the above coating composition by using a curtain-coating method, gelation occurred immediately and the coating hardened in a few minutes. The coating film thus obtained had a good hardening property. When the coating film was torn off with a knife after drying, it was observed to have fully permeated into the inner structure of the rust. Further, the coating film had improved coating properties such as a high impact property.

EXAMPLE 25

1.0 g of each polymerizable monomer listed in the following Table 10 was added with stirring to 96 ml of an aqueous monomer mixture solution containing 0.99 mol/1 acrylamide and 0.01 mol/1 N,N'-methylene bisacrylamide, respectively.

Table 10

| Copolymerizable monomer having at least one selected from the group consisting of hydroxyl group, amino group, quaternaryammonium group, aldehyde group and merapto group; |
|---|
| hydroxyethyl methacrylate, hydroxyethyl acrylate, 2-hydroxypropyl methacrylate, 2-hydroxypropyl acrylate, N-(1-deoxy-D-glucosyl)-acrylamide, N-(1-deoxy-D-glucosyl)-methacrylamide, p-vinylphenyl glucoside, diethyleneglycol mono-vinyl ether, N-methylol acrylamide, N-hydroxyethyl acrylamide, glycine allyl ester, N-vinyl urethane, allyl urea, dimethylaminoethyl methacrylate, diallyl-dimethyl-ammonium bromide, 2-(1-aziridinyl)ethyl methacrylate, allyl mercaptane and croton aldehyde. |

Table 9

| Comonomer used | HEA | HEMA | EA | AEMA | IMA | IA | IA-Na$_2$ | HEA/EA = 1/1 | AA/AEMA = 1/1 | HEMA/AEMA = 1/1 | EA/AEMA = 1/1 | IA-Na$_2$/AEMA = 1/1 |
|---|---|---|---|---|---|---|---|---|---|---|---|---|
| Hardening property | ⊚ | ⊚ | ⊚ | ⊚ | ⊚ | ⊚ | ⊚ | ⊚ | ⊚ | ⊚ | ⊚ | ⊚ |
| Adhesion property | ⊚ | ○ | ○ | ○ | ⊚ | ⊚ | ⊚ | ○ | ⊚ | ⊚ | ○ | ○ |

Note: The abbreviations and symbols used in above Table are the same as defined in Table 5.

When coatings were formed in the same manner as above, except that tetraethyleneglycol dimethacrylate one time and, next, phthalic acid di(diethyleneglycol methacrylate) was used, instead of the comonomer listed in Table 9, the coatings also completely hardened.

A 0.1 mol/1 ammonium cerium (IV) nitrate solution was prepared by using a 0.1N nitric acid solution. 1 ml of this solution containing ceric ion was added to each aqueous monomer solution prepared above and, then, deionized water was added thereto in such an amount that the total volume of the composition was 98 ml. Thus, eighteen coating compositions were prepared. The compositions thus obtained were brown or turbid white because of the formation of intermolecular compounds of ceric ion. The surfaces of eighteen rusty steel plates, prepared as described in Example 8 were coated with the eighteen coating compositions, prepared above, respectively, by using a curtain-coating method and, then, sulfur dioxide gas was uniformly blown against the entire surfaces for a few seconds. Gelation of the coating occurred immediately, and the coating hardened in a few minutes.

Each coating film had a good hardening property. When each coating film was torn off with a knife, it was observed that the coating fully permeated into the rust.

EXAMPLE 26

Coating films were formed in the same manner as in Example 25 by using hydroxyethyl acrylate as a polymerizable monomer shown in Table 10, except that 2 ml of a 2% aqueous solution of each sulfur compound listed in Table 11 below was sprayed instead of sulfur dioxide. Gelation of the coatings was initiated immediately, and the coatings hardened in a few minutes.

All the coating films had a good hardening property. When the coatings were torn off with a knife after drying, it was observed that they had permeated into the rust.

Table 11

| Potassium sulfite, ammonium sulfite, sodium bisulfite, potassium bisulfite, ammonium bisulfite, sodium thiosulfate, sodium hydrosulfate, sodium metabisulfite, sodium pyrosulfate, sodium tetrathionate, dimethyl sulfoxide and sodium dodecanesulfinate. |
| --- |

EXAMPLE 27

Five kinds of coating compositions were prepared by the following procedure.

98 ml of an aqueous solution containing of 0.89 mol/l acrylamide, 0.01 mol/l N,N'-methylene bisacrylamide and the comonomer listed in Table 12 below was prepared, and thereto about 500 mg of dimethylaminoethyl methacrylate was added. Then, 2 ml of the aqueous solution containing the ceric salt used in Example 25 was added.

The surfaces of five rusty steel plates, prepared in the same manner as in Example 26, were coated with the coating composition, thus obtained, respectively, by using a curtain-coating method and, then a small amount of a 2% aqueous sodium sulfite solution was sprayed onto the surface. The results with respect to hardening property and adhesion property to the substrate, of the coating films thus obtained, are shown in Table 12.

Table 12

| Comonomer used | HEMA | EA | AA | IA | IA-Na |
| --- | --- | --- | --- | --- | --- |
| Hardening property | ◉ | ◉ | ◉ | ◉ | ◉ |
| Adhesion property | ○ | ○ | ◉ | ○ | ○ |

Note: The abbreviations and symbols used in the table are the same as defined in Table 5.

When a coating was prepared in the same manner as mentioned above except that equimolar quantity of tetraethylene-glycol dimethacrylate one time and, next, phthalic acid di(diethyleneglycol methacrylate)ester was used instead of the comonomers shown in Table 12, the coating also hardened completely.

EXAMPLE 28

The surfaces of eighteen rusty steel plates were coated with a 2% aqueous sodium sulfite solution by using a curtain-coating method. After drying, a thin layer of sodium sulfite was formed on the surfaces of the steel plates. The eighteen steel plates having the thin layers were coated with the eighteen kinds of coating compositions, prepared in Example 25, respectively. In each case, gelation of the coating occurred immediately, and the coating hardened in a few minutes. It was observed that the state of the hardened coating film thus obtained was substantially the same as that obtained in Example 25.

EXAMPLE 29

100 parts of a copolymer solution prepared by polymerizing 37 parts of dodecyl methacrylate, 26 parts of styrene, 12 parts of 2-hydroxyethyl methacrylate, 15 parts of N-butoxymethyl acrylamide and 4 parts of itaconic acid in 79 parts of isopropanol, were neutralized by adding 3 parts of β-dimethylamino ethanol.

To 3000 parts of the neutralized copolymer solution prepared as above, 750 parts of red oxide was added and, then, they were mixed for 24 hours in a ball mill, followed by dilution with water to five times the original volume. In the aqueous copolymer dispersion containing red oxide thus obtained, acrylamide and N,N'-methylene bisacrylamide were dissolved in such amounts that the concentration of the former was 0.99 mol/l and that of the latter 0.01 mol/l.

A coating composition was prepared by adding, to 98 ml of the mixture so obtained, 2 ml of the aqueous solution containing the ceric salt prepared in Example 25 and 1 ml of hydroxyethyl acrylate. When a rusty steel plate was coated with this coating composition by using a curtain-coating method, followed by blowing sulfur dioxide gas, gelation of the coating occurred immediately and the coating hardened in a few minutes. The coating so obtained was allowed to stand in air at ambient temperature to thereby produce a coated plate having a red crosslinked coating film.

EXAMPLE 30

1.0 g of each polymerizable monomer shown in Table 10 was added with stirring to 96 ml. of an aqueous monomer mixture solution containing 0.99 mol/l acrylamide and 0.01 mol/l N,N'-methylene bisacrylamide. Then, 2 ml of a 2% aqueous sodium sulfite solution was added to each mixture. Thus eighteen kinds of aqueous compositions were prepared. A 0.1 mol/l ammonium cerium (IV) nitrate solution was separately prepared by using a 0.1N nitric acid solution.

The surfaces of eighteen steel plates having redbrown rust, prepared as described in Example 8, were coated with the aqueous ammonium cerium (IV) nitrate solution prepared above by using a curtain-coating method, and dried. Thus, a thin layer of the cerium salt was formed on each of the steel plates. When the eighteen steel plates were coated with the eighteen coating compositions, prepared above, respectively, gelation of the coatings occurred immediately and the coatings hardened in a few minutes. All the coating films had a good hardening property. When the coating films were torn off with a knife, it was observed that the coating films had fully permeated into the inner structure of the rust.

EXAMPLE 31

Each surface of the thirteen pieces of rusty steel plates, having a thin layer of ammonium cerium (IV) nitrate prepared in the same manner as in Example 30, was coated with the aqueous composition containing hydroxyethyl acrylate prepared in Example 30 and, then, 2 ml of an about 2% aqueous solution of each sulfur compound shown in Table 7 of Example 14 was sprayed thereon. Gelation of the coatings occurred immediately, and the coatings hardened in a few minutes. All the coating films thus obtained had a good hardening property. When the coating films were torn off with a knife after drying, it was observed that the coating films had fully permeated into the inner structure of the rust.

EXAMPLE 32

Five kinds of aqueous compositions containing 0.89 mol/l acrylamide, 0.01 mol/l N,N'-methylene bisacrylamide and 0.1 mol/l of each comonomer listed in Table 13 below were prepared by mixing these compounds with one another. Then, about 500 mg of dimethylaminoethyl methacrylate was added to each aqueous composition.

The surfaces of five rusty steel plates, having a thin layer of ammonium cerium (IV) nitrate, prepared as described in Example 30, were coated with the five aqueuos compositions, prepared above, respectively, followed by spraying 2 ml of a 2% aqueous sodium sulfite solution thereon. The coatings completely hardened in about two minutes at ambient temperature.

The results with respect to hardening property and adhesion property to the substrate, of the coating films, are shown in the following Table 13.

Table 13

| Comonomer used | HEMA | EA | AA | IA | IA-Na |
|---|---|---|---|---|---|
| Hardening property | ◎ | ◎ | ◎ | ◎ | ◎ |
| Adhesion property | ○ | ○ | ◎ | ○ | ○ |

Note: The abbreviations and symbols used in the table are the same as defined in Table 5.

When a coating was prepared in the same manner as above, except that an equimolar quantity of tetraethyleneglycol dimethacrylate one time and, next, phthalic acid di(diethyleneglycol methacrylate)ester, was substituted for the compound shown in Table 13, the coating also hardened completely.

EXAMPLE 33

To 1 liter of an aqueous resin composition containing red oxide prepared as described in Example 12, 1 ml of hydroxyethyl acrylate as well as acrylamide and N,N'-methylene bisacrylamide in such amounts that the concentration of acrylamide was 0.99 mol/l and that of N,N'-methylene bisacrylamide was 0.01 mol/l, were added. The surfaces of a steel plate having a thin layer of ammonium cerium (IV) nitrate, prepared as described in Example 30, was coated with the composition thus obtained, followed by spaying 2 ml of a 2% aqueous sodium sulfite solution thereon. Gelation of the coating occurred immediately, and the coating hardened in a few minutes. When the coating film so obtained was allowed to stand in air at ambient temperature, a coated plate having a brown crosslinked coating film was formed.

EXAMPLE 34

100 ml of one hundred and eleven kinds of aqueous coating compositions were prepared by adding 200 mg of each compound shown in Table 1 to 98 ml of an aqueous monomer mixture solution containing 0.99 mol/l acrylamide and 0.01 mol/l N,N'-methylene bisacrylamide and, then, adding about 2 ml of water. A 0.1 mol/l aqueous ammonium cerium (IV) nitrate solution was separately prepared.

One hundred and eleven mild steel plates with red rust and the same number of mild steel plates after degreasing, water-washing and air-drying were coated with the aqueous ammonium cerium (IV) nitrate solution, by using a curtain-coating method, and dried. Then the 111 kinds of aqueous solutions, prepared above, were coated on the 111 washed steel plates, respectively. When a 2% aqueous sodium sulfite solution was sprayed on the coated surface of each of the steel plates gelation of the coating occurred immediately, and the hardened coating film was formed in a few minutes.

Both the coating films on the degreased plates and coating films on the rusty plates had a good property of adhesion to the substrate. When the coating films on the rusty plates were torn off with a knife, the coating films were dark-brown and had fully permeated into the inner structure of the rust.

EXAMPLE 35

An aqueous composition was prepared by adding 200 mg of methanol to 98 ml of the aqueous solution containing acrylamide and N,N'-methylene bisacrylamide, prepared as described in Example 34 and, then, adding water until the total volume of the composition was 100 ml.

The surfaces of twelve rusty steel plates and twelve degreased steel plates, prepared as described in Example 34, were coated with an aqueous ammonium cerium (IV) nitrate and dried and, then, coated with the aqueous composition prepared above by using a curtain-coating method. When a 2% aqueous solution of each sulfur compound shown in Table 11 of Example 26 was sprayed onto the surface of the twelve steel plate so treated, respectively, gelation of the coating occurred immediately and the coating completely hardened in a few minutes.

EXAMPLE 36

Each monomer listed in Table 14 below was added to an aqueous solution containing 0.89 mol/l acrylamide and 0.01 mol/l N,N'-methylene bisacrylamide in such an amount that the concentration of the monomer listed in Table 14 was 0.1 mol/1. To 98 ml of each of these solutions, 200 mg of methanol was added and, then, water was added until the total volume of the solution was 100 ml. Thus, twelve kinds of aqueous compositions were prepared.

The surfaces of twelve rusty steel plates, having a dried thin layer of the ceric compound, prepared in Example 30, were coated with the twelve kinds of the aqueous compositions, prepared above, respectively, by using a curtain-coating method. Then a 2% aqueous sodium sulfite solution was sprayed on the coated plate, gelation of the coating occurred immediately.

The results with respect to hardening property and adhesion property, of the coating film, are shown in Table 14.

Table 14

| Comonomer used | HEA | HEMA | EA | AEMA | IMA | IA | IA-Na$_2$ | HEA/EA =1/1 | AA/AEMA =1/1 | HEMA/AEMA =1/1 | EA/AEMA =1/1 | IA-Na$_2$/AEMA =1/1 |
|---|---|---|---|---|---|---|---|---|---|---|---|---|
| Hardening property | ◎ | ◎ | ◎ | ◎ | ◎ | ◎ | ◎ | ◎ | ◎ | ◎ | ◎ | ◎ |
| Adhesion property | ◎ | ○ | ○ | ○ | ◎ | ○ | ○ | ○ | ◎ | ◎ | ○ | ○ |

Note: The abbreviations and symbols used in above Table are the same as defined in Table 5.

When a coating film was prepared in the same manner as above, except that equimolar quantity of tetraethyleneglycol dimethacrylate one time and, next, phthalic acid di(diethylene-glycol methacrylate)ester was used instead of the comonomer listed in Table 14, both coating films had an excellent hardening property and a good adhesion property to the substrate.

EXAMPLE 37

An aqueous composition containing 0.99 mol/l acrylamide and 0.01 mol/l N,N'-methylene bisacrylamide was prepared by adding acrylamide and N,N'-methylene bisacrylamide to an aqueous resin dispersion containing red oxide, prepared as described in Example 28.

The surface of a rusty steel plate, having a thin layer of ceric salt, was coated with the above composition, followed by blowing sulfur dioxide gas thereon. Gelation of the coating occurred immediately and the coating hardened in a few minutes.

EXAMPLE 38

The surfaces of twelve rusty steel plates were coated with a 2% aqueous sodium sulfite solution by using a curtain-coating method, and dried. Then, the surfaces of the twelve plates were coated with the twelve kinds of aqueous compositions, prepared as described in Example 35, respectively, followed by spraying thereon an aqueous solution containing 0.1 mol/l ammonium cerium (IV) nitrate, which solution was prepared by dissolving ammonium cerium (IV) nitrate in a 30% aqueous isopropanol solution. Gelation of the coating occurred immediately and the coating hardened completely in a few minutes.

EXAMPLE 39

Coating films were prepared by the same procedure as in Example 1, except that 0.1 mol/l aqueous solutions of ferric compounds listed in Table 15 below were used instead of the aqueous ammonium cerium (IV) nitrate solution. Gelation of the coatings occurred and hardened coating films were obtained.

TABLE 15

Ferric chloride, ferric nitrate, ferric sulfate, ferric hydroxide, ammonium iron alum (Fe$_2$(SO$_4$)$_3$·(NH$_4$)$_2$SO$_4$·24H$_2$O).

What we claim is:

1. A process for preparing a gel polymer in the absence of peramides, hydroperoxides, persulfates and peroxides which consists essentially of: admixing a composition (B) which comprises at least one compound which, in an aqueous medium, has at least one hydroxyl group with at least one compound (C) capable of producing ferric ions or cerric ions in an aqueous medium, so as to form an intermolecular compound of (B) and (C), reacting said intermolecular compound with a sulfur compound (D) which is capable of producing sulfur-containing ions selected from the group consisting of $SO_2^{-2}$, $SO_3^{-2}$, $S_2O_3^{-2}$, $S_2O_4^{-2}$, $S_2O_5^{-2}$, $S_2O_6^{-2}$, $S_2O_7^{-2}$, $S_3O_6^{-2}$, $S_4O_6^{-2}$, $S_5O_6^{-2}$, and $S_6O_6^{-2}$, in an aqueous medium, so as to form a polymerization initiator; and reacting an aqueous composition (A) comprising an aqueous solvent and at least one water soluble vinyl compound selected from the group consisting of alkyl acrylates having 1 to 4 carbon atoms in the alkyl group, alkyl methacrylates having 1 to 4 carbon atoms in the alkyl group, acrylamide, methacrylamide, acrylic acid, methacrylic acid, itaconic acid, crotonic acid, α-methyleneglutaric acid, p-vinylbenzene sulfonic acid, 2-sulfoethyl acrylate, 2-sulfoethyl methacrylate, 2-acrylamide-2-methylpropane sulfonic acid and sodium, potassium and ammonium salts of said acids; diallyldimethyl ammonium bromide; methylene bisacrylamide, methylene bismethacrylamide; compounds having the general formula, $$CH_2=\overset{R_1}{\underset{}{C}}-COO-(CH_2-\overset{H}{\underset{R_2}{C}}-O)_{m}OCC=CH_2 \text{ or}$$

$$CH_2=\overset{R_1}{\underset{}{C}}-COO-(CH_2-\overset{H}{\underset{R_2}{C}}-O)-OC-$$

$$-R_3CO-(O-\overset{H}{\underset{R_2}{C}}-CH_2)_{l}OOCC=CH_2$$

wherein $R_1$ and $R_2$ are —H or —CH$_3$, $R_3$ is an alkalene group, —CH=CH—, $$\text{(benzene ring)}$$

or $$-\overset{}{\underset{CH_2}{C}}-CH_2-$$

and m and l is an integer of 1 to 10; glycerin triacrylate, glycerin trimethacrylate, trimethylolpropane triacrylate, trimethylolpropane trimethacrylate, pentaerythritol pentaacrylate, pentaerythritol pentamethacrylate;

acryloyl or methacryloyl compounds of N-methylol- or N-alkylol-benzoguanamine, acryloyl or methacryloyl compounds of N-methylol- or N-alkylol-melamine in the presence of said polymerization initiator to form said gel polymer.

2. The process of claim 1 wherein (C) is a compound capable of producing cerric ion in an aqueous medium.

3. A process for preparing a gel polymer in the absence of peramides, hydroperoxides, persulfates and peroxides which consists essentially of: admixing a composition (B) which comprises at least one compound, which is capable of forming an intermolecular compound with a cerric ion, with at least one compound (C) capable of producing a cerric ion in an aqueous medium, so as to form an intermoleuclar compound of (B) and (C), reacting said intermolecular compound with a sulfur compound (D) which is capable of producing sulfur-containing ions selected from the group consisting of $SO_2^{-2}$, $SO_3^{-2}$, $S_2O_3^{-2}$, $S_2O_4^{-2}$, $S_2O_5^{-2}$, $S_2O_6^{-2}$, $S_2O_7^{-2}$, $S_3O_6^{-2}$, $S_4O_6^{-2}$, $S_5O_6^{-2}$, and $S_6O_6^{-2}$, in an aqueous medium, so as to form a polymerization initiator; and reacting an aqueous composition (A) comprising an aqueous solvent and at least one member selected from the group consisting of water-soluble and water-dispersible vinyl compounds selected from the group consisting of alkyl acrylates having 1 to 4 carbon atoms in the alkyl group, alkyl methacrylates having 1 to 4 carbon atoms in the alkyl group, acrylamide, methacrylamide, acrylic acid, methacrylic acid, itaconic acid, crotonic acid, α-methyleneglutaric acid, p-vinylbenzene sulfonic acid, 2-sulfoethyl acrylate, 2-sulfoethyl methacrylate, 2-acrylamide-2-methylpropane sulfonic acid and sodium, potassium and ammonium salts of said acids; diallyl-dimethyl ammonium bromide; methylene bisacrylamide, methylene bismethacryl-amide; compounds having the general formula,

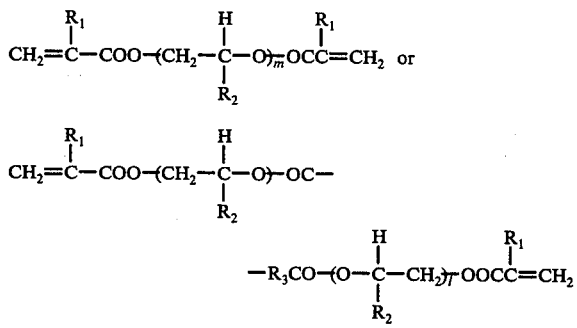

wherein $R_1$ and $R_2$ are —H or —$CH_3$, $R_3$ is an alkalene group, —CH=CH—,

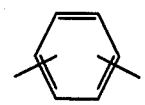

or

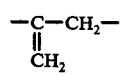

and $m$ and $l$ is an integer of 1 to 10; glycerin triacrylate, glycerin trimethacrylate, trimethylolpropane triacrylate, trimethylolpropane trimethacrylate, pentaerythritol pentaacrylate, pentaerythritol pentamethacrylate; acryloyl or methacryloyl compounds of N-methylol- or N-alkylol-benzoguanamine, acryloyl or methacryloyl compounds of N-methylol- or N-alkylol-melamine in the presence of said polymerization initiator to form said gel polymer.

4. The process of claim 3, wherein composition (B) is at least one compound which, in an aqueous medium, has at least one hydroxyl group.

5. the process of claim 3, wherein composition (B) is a compound which, in an aqueous medium, contains at least one group selected from the group consisting of amino and a quaternary ammonium groups.

6. The process of claim 3, wherein composition (B) is a compound which, in an aqueous medium, contains at least one aldehyde group.

7. The process of claim 3, wherein composition (B) is a compound which, in an aqueous medium, contains at least one mercapto group.

8. The process of claim 3, wherein composition (A) comprises an aqueous solvent and a water-soluble vinyl compound.

9. The process of claim 3, wherein said composition (B) is a mixture of at least one non-polymerizable compound, which, in an aqueous medium, has at least two functional groups selected from the group consisting of hydroxyl, amino, quarternary ammonium, aldehyde, and mercapto, and at least one vinyl compound having at least one of said functional groups.

10. A process for preparing a gel polymer in the absence of peramides, hydroperoxides, persulfates and peroxides which consists essentially of: admixing a composition (B) which comprises at least one compound, which is capable of forming an intermolecular compound with a cerric ion, or ferric ion, with at least one compound (C) capable of producing a cerric ion or ferric ion in an aqueous medium, so as to form an intermolecular compound of (B) and (C), reacting said intermolecular compound with a sulfur compound (D) which is capable of producing sulfur-containing ions selected from the group consisting of $SO_2^{-2}$, $SO_3^{-2}$, $S_2O_3^{-2}$, $S_2O_4^{-2}$, $S_2O_5^{-2}$, $S_2O_6^{-2}$, $S_2O_7^{-2}$, $S_3O_6^{-2}$, $S_4O_6^{-2}$, $S_5O_6^{-2}$, and $S_6O_6^{-2}$, in an aqueous medium, so as to form a polymerization initiator; and reacting an aqueous composition (A) comprising an aqueous solvent and at least one member slected form the group consisting of water-soluble and water-dispensible vinyl compounds selected from the group consisting of alkyl acrylates having 1 to 4 carbon atoms in the alkyl group, alkyl methacrylates having 1 to 4 carbon atoms in the alkyl group, acrylamide, methacrylamide, acrylic acid, methacrylic acid, itaconic acid, crotonic acid, α-methyleneglutaric acid, p-vinylbenzene sulfonic acid, 2-sulfoethyl acrylate, 2-sulfoethyl methacrylate, 2-acrylamide-2-methylpropane sulfonic acid and sodium, potassium and ammonium salts of said acids; diallyldimethyl ammonium bromide; methylene bisacrylamide, methylene bismethacrylamide; compounds having the general formula,

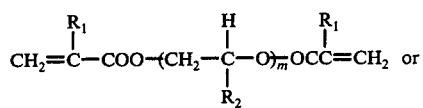

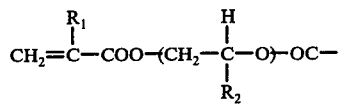

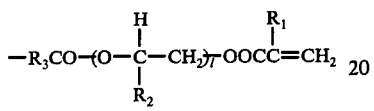

wherein $R_1$ and $R_2$ are —H or —CH$_3$, $R_3$ is an alkalene group, —CH=CH—,

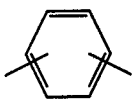

or

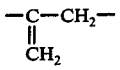

and $m$ and $l$ is an integer of 1 to 10; glycerin triacrylate, glycerin trimethacrylate, trimethylolpropane triacrylate, trimethylolpropane trimethacrylate, pentaerythritol pentaacrylate, pentaerythritol pentamethacrylate; acryloyl or methacryloyl compounds of N-methylol- or N-alkylol-benzoguanamine, acryloyl or methacryloyl compounds of N-methylol- or N-alkylol-melamine in the presence of said polymerization initiator to form said gel polymer.

11. The process of claim 10 wherein composition (B) is at least one compound which, in an aqueous medium, contains at least one functional group selected from the group consisting of hydroxyl, amino, quaternary ammonium, aldehyde and mercapto groups.

* * * * *